United States Patent
Kozuka

(10) Patent No.: US 10,728,409 B2
(45) Date of Patent: Jul. 28, 2020

(54) ELECTRONIC APPARATUS WITH A USER INTERFACE MODULE HAVING A DIAGNOSIS UNIT TO DETECT AN ABNORMALITY OF A DISPLAY AT THE TIME OF BOOT, AND ABNORMALITY DETECTION METHOD

(71) Applicant: CANON KABUSHIKI KAISHA, Tokyo (JP)

(72) Inventor: Yasuhiro Kozuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/361,552

(22) Filed: Mar. 22, 2019

(65) Prior Publication Data

US 2019/0306360 A1 Oct. 3, 2019

(30) Foreign Application Priority Data

Mar. 27, 2018 (JP) ................. 2018-060276

(51) Int. Cl.
| | |
|---|---|
| *G06F 15/00* | (2006.01) |
| *G06K 15/00* | (2006.01) |
| *G06K 1/00* | (2006.01) |
| *H04N 1/00* | (2006.01) |
| *G06F 1/3215* | (2019.01) |
| *G06F 1/3234* | (2019.01) |

(52) U.S. Cl.
CPC ......... *H04N 1/00888* (2013.01); *G06F 1/325* (2013.01); *G06F 1/3215* (2013.01); *H04N 1/00899* (2013.01)

(58) Field of Classification Search
CPC ............ H04N 1/00888; H04N 1/00899; G05F 1/3215; G05F 1/325

USPC ............................... 358/1.14, 1.15, 1.13, 1.1
See application file for complete search history.

(56) References Cited

U.S. PATENT DOCUMENTS

| | | |
|---|---|---|
| 2002/0001475 A1 | 1/2002 | Kikuchi et al. |
| 2011/0222097 A1 | 9/2011 | Miyoshi |

(Continued)

FOREIGN PATENT DOCUMENTS

| | | |
|---|---|---|
| JP | 10268850 | 10/1998 |
| JP | 2002041691 A | 2/2002 |

(Continued)

OTHER PUBLICATIONS

Japanese Office Action issued in corresponding Japanese Application No. 2018060276 dated May 21, 2019.

*Primary Examiner* — Douglas Q Tran
(74) *Attorney, Agent, or Firm* — Venable LLP

(57) ABSTRACT

The electronic apparatus includes a controller that performs control of the entire apparatus and a UI module that performs a display for a user interface by using an image data supplied from the controller. Then, the controller includes a first processor and the UI module includes a second processor, respectively. Then, the controller diagnoses an abnormality of at least the first processor at the time of boot of the electronic apparatus. Then, the UI module diagnoses an abnormality of the display and notifies, in a case where an abnormality of the display is detected at the time of boot of the electronic apparatus, the controller of the detected abnormality by communication between the second processor and the first processor.

9 Claims, 14 Drawing Sheets

(56) References Cited

U.S. PATENT DOCUMENTS

2012/0290884 A1* 11/2012 Hamaguchi ......... G06F 11/1417
                                                        714/49
2016/0337530 A1    11/2016 Kozuka et al.
2016/0352928 A1    12/2016 Hashimoto
2017/0147455 A1*   5/2017  Sakuma .............. G06F 11/2028

FOREIGN PATENT DOCUMENTS

| JP | 2010244185 A | 10/2010 |
| JP | 2011192006 A | 9/2011 |
| JP | 2016218553 A | 12/2016 |
| JP | 2016221873 A | 12/2016 |

* cited by examiner

ELECTRONIC APPARATUS WITH A USER INTERFACE MODULE HAVING A DIAGNOSIS UNIT TO DETECT AN ABNORMALITY OF A DISPLAY AT THE TIME OF BOOT, AND ABNORMALITY DETECTION METHOD

BACKGROUND OF THE INVENTION

Field of the Invention

The present invention relates to a self-diagnosis technique to detect an abnormal state in an electronic apparatus.

Description of the Related Art

A general electronic apparatus has a user interface (hereinafter, described as "UI") for displaying information to a user and receiving an operation. This UI is made use of to display a report in a case where an abnormality occurs within the apparatus, but in a case where some abnormality occurs at a portion relating to the screen display of the UI, it is no longer possible to display a report of the occurrence of abnormality. In this case, it is not possible for a user or the like to know what kind of abnormality has occurred at which portion within the apparatus, and therefore, much effort and time are required for specifying the abnormal portion and grasping the contents thereof Regarding this point, for example, Japanese Patent Laid-Open No. H10-268850 has disclosed a technique to specify the location of a failure by lighting a display LED in a display pattern in accordance with the place of the occurrence of the failure in a case where the failure is detected by determining in advance the display pattern of the LED in a case where a failure occurs for each of pluralities of circuit blocks possessed by an electronic apparatus.

In the above-described technique, a microcomputer connected with a plurality of circuit blocks via a bus performs failure notification control by taking in diagnosis results determined and held in each block via an I/O port with each circuit block (see FIG. 1 and the like in Japanese Patent Laid-Open No. H10-268850). Here, for example, in a case where the technique of Japanese Patent Laid-Open No. H10-268850 is applied to an electronic apparatus having multiple functions, such as an MFP (Multi Function Peripheral) having a plurality of functions, such as a function as a printer, a function as a copy machine, and a function as a facsimile, the number of failure detection-target modules increases, and therefore, the number of main controllers in charge of failure notification control and the number of I/O ports with each function module increase and the cost is raised as a result.

Further, in a case of an electronic apparatus that controls the above-described UI display control in a module independent of the main controller, unless an I/O port that connects the module and the main controller is provided, it is not possible to detect an abnormality relating to the UI display. Further, in a case where the UI display operates normally, it is sufficient to report a failure by the screen display on the UI. There is no necessity to report a failure not relating to the UI display by using an LED.

Consequently, an object of one aspect of the present invention is to provide a mechanism to diagnose an abnormality relating to the UI display. An object of another aspect of the present invention is to make it possible to detect an abnormality relating to the UI display without increasing the number of I/O ports and to notify a user or the like of the abnormality in an electronic apparatus that performs the UI display control in a module independent of the main controller.

SUMMARY OF THE INVENTION

The electronic apparatus according to the present invention is an electronic apparatus including: a controller having a first processor and performing control of the entire apparatus; and a UI module having a second processor and performing a display for a user interface by using an image data supplied from the controller, and the controller has a first diagnosis unit configured to diagnose an abnormality of at least the first processor at the time of boot of the electronic apparatus and the UI module: has a second diagnosis unit configured to diagnose an abnormality of the display; and notifies the controller of, in a case where an abnormality is detected by the second diagnosis unit at the time of boot of the electronic apparatus, the detected abnormality by communication between the second processor and the first processor.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

[First Embodiment]

(System Configuration)

Figure 1:
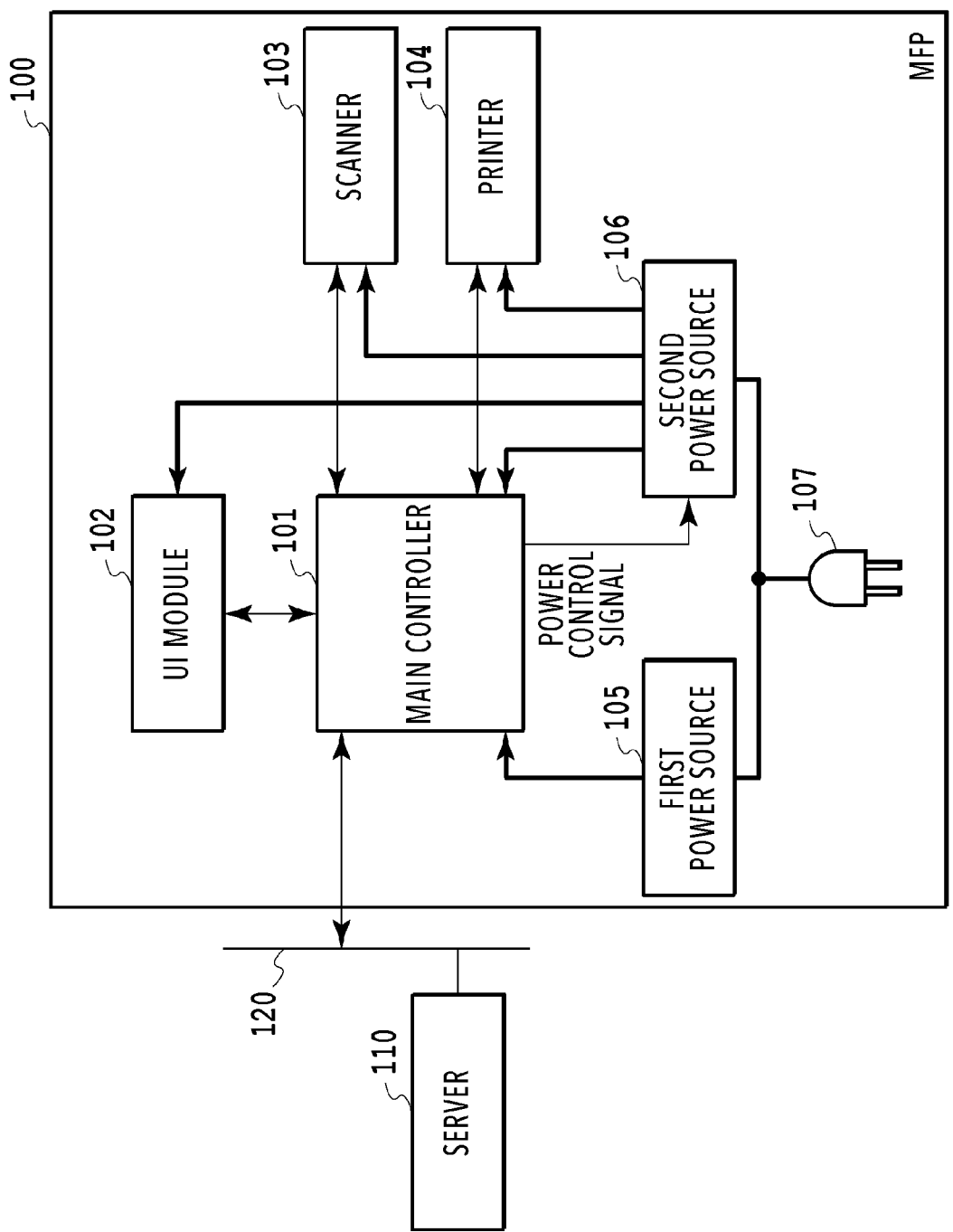
FIG. 1 is a system configuration diagram including an MFP according to a first embodiment.

FIG. 1 is a system configuration diagram including an MFP 100 as an electronic apparatus to which it is possible to apply the present embodiment. The MFP 100 includes a main controller 101, a dedicated module in charge of a user interface, a scanner 103, a printer 104, a first power source 105, and a second power source 106 and is connected with a server 110 via a LAN 120. For convenience of explanation, the dedicated module 102 in charge of a user interface is described as the "UI module 102" in the following. The server 110 is an information collection server that acquires and saves error information and the like on the MFP 100. Although not shown in FIG. 1, to the LAN 120, one or a plurality of PCs transmitting a print job to the MFP 100 is connected. Further, the MFP 100 is also connected with a device having a FAX communication function via a telephone line, not shown schematically. In the following, with reference to FIG. 1, an outline of a hardware configuration of the MFP 100 is explained.

(Hardware Configuration of MFP)

The main controller 101 is a module in charge of main control that centralizedly controls each unit of the MFP 100. For example, the main controller 101 converts and saves various kinds of data, performs transmission and reception of various kinds of data with the server 110, performs control of power that is supplied to the inside of the MFP 100, and so on. The UI module 102 is a module in charge of control relating to a UI display, which displays various kinds of information to a user and which is in charge of a display and an operation for a user to perform various input operations. The scanner 103 is a module that acquires image data by optically reading a document placed on a document table or an ADF (Auto Document Feeder), not shown schematically. The printer 104 is a module that prints and outputs a variety of pieces of image data for which image processing has been performed in the main controller 101. The first power source 105 and the second power source 106 are each a module that converts an alternating-current commercial power source supplied from a power plug 107 into a direct-current power source and supplies the direct-current power source to the inside of the MFP 100. The turning on/off of the supply of power of the second power source 106 is controlled by a power control signal from the main controller 101. In the normal power mode, both the first power source 105 and the second power source 106 turn on and as will be described later, respectively supply power to predetermined supply destinations. On the other hand, in the power-saving mode, the first power source 105 remains on but the second power source 106 turns off. Here, the power-saving mode refers to an operation mode in which power consumption is reduced by suspending supply of power except for predetermined devices within the main controller 101 in a case where the MFP 100 is in a rest state where the MFP is not performing processing of various jobs. Even in the power-saving mode, it is possible for the main controller 101 to receive a job and in a case of receiving a job, the main controller 101 outputs a High power control signal to the second power source 106 to turn on the second power source 106 and causes the power mode to make a transition into the normal power mode.

(Details of Hardware Configuration)

Figure 2A:
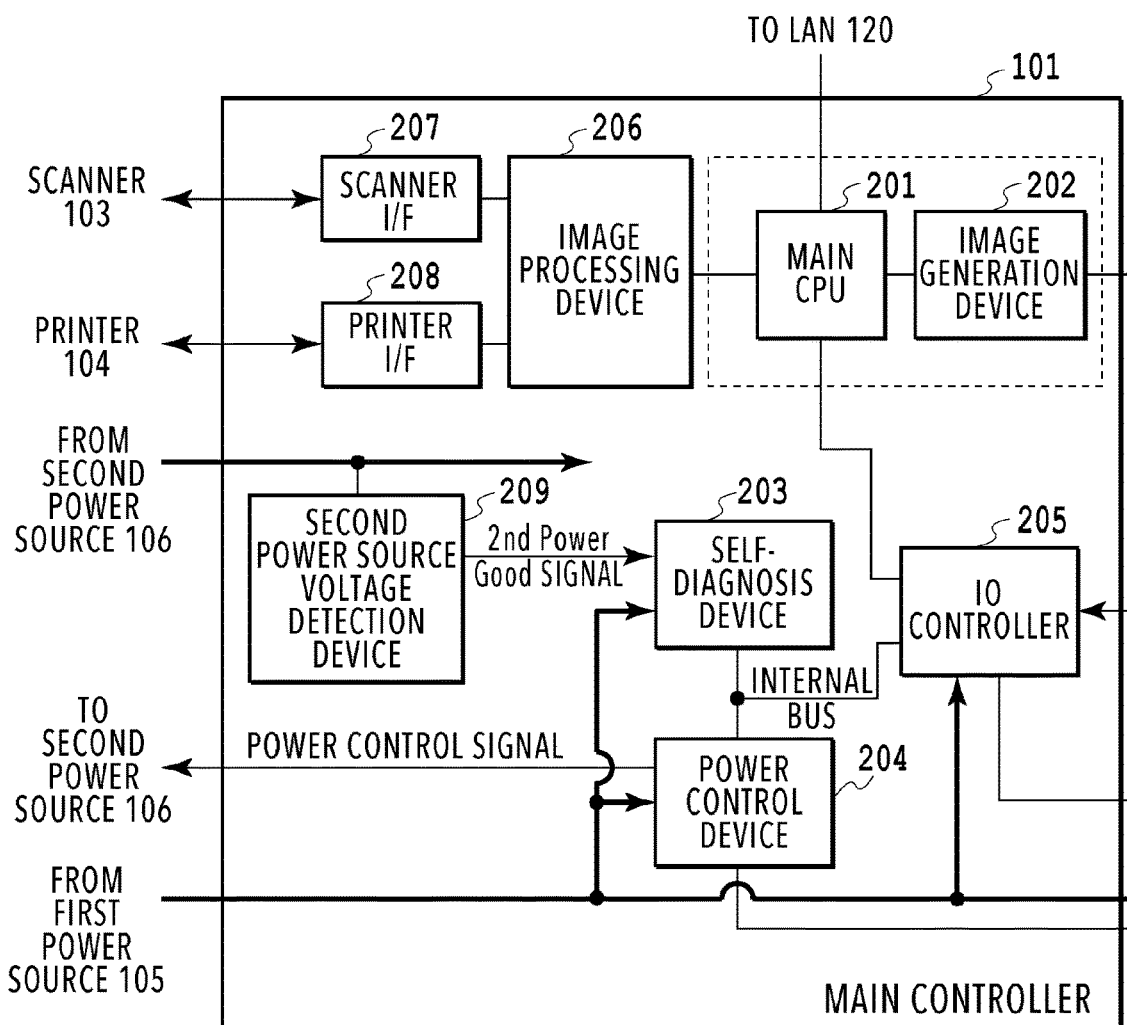
FIG. 2 is a diagram showing a relationship between FIGS. 2A and 2B, and FIGS. 2A and 2B are diagrams showing an internal configuration of a main controller and a UI module.
Figure 2B:
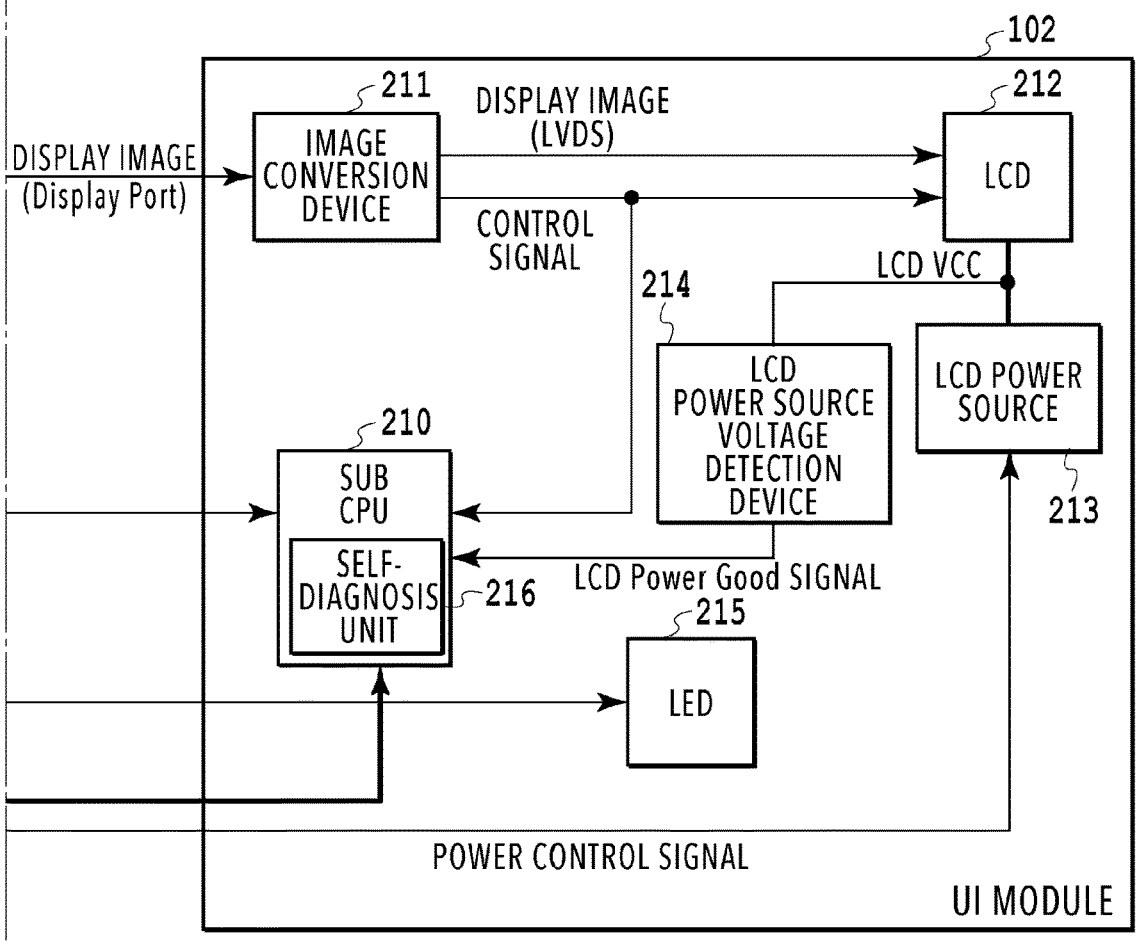

Next, the main controller 101 and the UI module 102 important in the present embodiment of the components of the MFP 100 are explained in detail. FIGS. 2A and 2B are block diagrams showing an internal configuration of the main controller 101 and the UI module 102. In FIGS. 2A and 2B, of lines that that connect with each block, thick lines indicate power lines and thin lines indicate signal lines.

<Main Controller>

First, the main controller 101 is explained in detail. The main controller 101 includes a main CPU 201, an IO controller 205, a scanner I/F 207, and a printer I/F 208. Further, the main controller 101 includes each device of an image generation device 202, a self-diagnosis device 203, a power control device 204, an image processing device 206, and a second power source voltage detection device 209. The main CPU 201 that centralizedly controls the inside of the main controller 101 is an example of a processor including a hardware circuit. The main CPU 201 generates an image to be displayed on the UI module 102 by controlling the image generation device 202, for example, such as a GPU (Graphics Processing Unit). Further, the main CPU 201 performs control of communication with an external device connected to the LAN 120 via a LAN controller, not shown schematically. The self-diagnosis device 203 self-diagnoses the presence/absence of abnormality of each device within the main controller 101 and each module connected to the main controller 101 at the time of boot of the MFP 100, and in a case of detecting an abnormality, the self-diagnosis device 203 specifies the location of a failure. Here, "the time of boot" of the MFP 100 includes both the time at which the main power switch (not shown schematically) thereof is turned on and the time at which the power mode returns from the above-described power-saving mode and makes a transition into the normal power mode. As the self-diagnosis device 203, for example, a CPLD (Complex Programmable Logic Device) is made use of Details of the self-diagnosis device 203 will be described later.

The power control device 204 receives supply of power from the first power source 105 and controls supply of power to the inside of the main controller 101 and other modules connected to the main controller 101 based on diagnosis results and the like by the self-diagnosis device 203. The direct-current power source from the first power source 105 is supplied to the self-diagnosis device 203, the power control device 204, and the IO controller 205 within the main controller 101 and a sub CPU 210 within the UI module 102. Then, the direct-current power source from the second power source 106 is supplied to the other devices and modules that do not operate in the power-saving mode, such as the main CPU 201. The IO controller 205 is connected with the main CPU 201 by, for example, PCI Express, and controls the UI module 102. Further, the IO controller 205 is connected with the self-diagnosis device 203 by an internal bus. The main CPU 201 accesses the self-diagnosis device 203 via the IO controller 205 and controls each device within the main controller 101 and the UI module 102 in accordance with the diagnosis results stored within the self-diagnosis device 203. In FIG. 2A, the all-night power source supplied from the first power source 105 and the power source supplied from the second power source 106 are connected directly to each block indicating a device and a module. However, the configuration is not limited to the configuration such as this, and for example, a configuration may be accepted in which the power source is branched into the power source voltage necessary for each block by making use of a DC-DC converter or a regulator. However, the all-night power source supplied from the first power source 105 is supplied at timing earlier than the timing of the power source supplied from the second power source 106.

The image processing device 206 performs a variety of kinds of image processing for the input image data. The scanner I/F 207 receives scan image data from the scanner 103 and outputs the scan image data to the image processing device 206. The printer I/F 208 outputs the image data processed by the image processing device 206 to the printer 104. The second power source voltage detection unit 209 detects the direct-current power source from the second power source 106 and checks whether the supply is normal. Specifically, in a case of detecting that the supply of power from the second power source 106 to each unit within the main controller 101 is performed at the normal voltage level, the second power source voltage detection unit 209 generates a 2nd Power Good signal. In a case where the 2nd Power Good signal is asserted, the main CPU 201 starts to boot.

<UI Module>

Next, the UI module 102 is explained in detail. The UI module 102 includes the sub CPU 210, an image conversion device 211, an LCD 212, an LCD power source 213, an LCD power source voltage detection device 214, and an LED 215. The sub CPU 210 for controlling each unit within the UI module 102 is connected with the IO controller 205 by, for example, the UART and performs inter-CPU communication with the main CPU 201 via the IO controller 205. The UART is an integrated circuit that performs conversion of a serial communication signal and a parallel communication signal and UART is an abbreviation of Universal Asynchronous Receiver-Transmitter.

Within the sub CPU 210, a self-diagnosis unit 216 exists. The self-diagnosis unit 216 diagnoses the presence/absence of abnormality relating to the UI display, including the coming-off of a cable and the breaking of a wire between the main controller 101 and the UI module 102, at the time of boot of the MFP 100. The time of boot includes the time of the return from the power-saving mode as described previously. Then, in a case where the self-diagnosis unit 216 detects an abnormality, the sub CPU 210 notifies the main CPU 201 that an abnormality relating to the UI display has occurred by inter-CPU communication via the IO controller 205. Details of the self-diagnosis unit 216 will be described later.

The image conversion device 211 converts an image of the Display Port standard for a UI display output from the image generation device 202 into an image of the LVDS standard that can be output by the LCD 212. The LCD power unit 213 supplies a backlight power source of the LCD 212 in accordance with the power control signal from the power control device 204. In a case of detecting that the supply of power from the LCD power source unit 213 to the LCD 212 is performed at the normal voltage level by the power source voltage (LCD VCC), the LCD power source voltage detection device 214 generates an LCD Power Good signal and outputs the LCD Power Good signal to the sub CPU 210. Further, at least a part of the control signal for the LCD 212 from the image conversion device 211 is input to the sub CPU 210 and made use of for the diagnosis of the presence/absence of abnormality relating to the UI display in the self-diagnosis unit 216 within the sub CPU 210. The control signal from the image conversion device 211 toward the LCD 212 includes, for example, a Panel power enable signal for turning on the power source of a panel, a Backlight enable signal for turning on the backlight, a PWM signal controlling a PWM frequency of the backlight, and so on. The LED 215 is a light emitting element for indicating the occurrence of an abnormality to a user in a case where the abnormality is detected by the self-diagnosis device 203 and the self-diagnosis unit 216. In the present embodiment, the lighting on/off of the LED 215 is controlled by the self-diagnosis device 203 and the main CPU 201 via the IO controller 205.

(Self-Diagnosis Device)

Figure 3A:
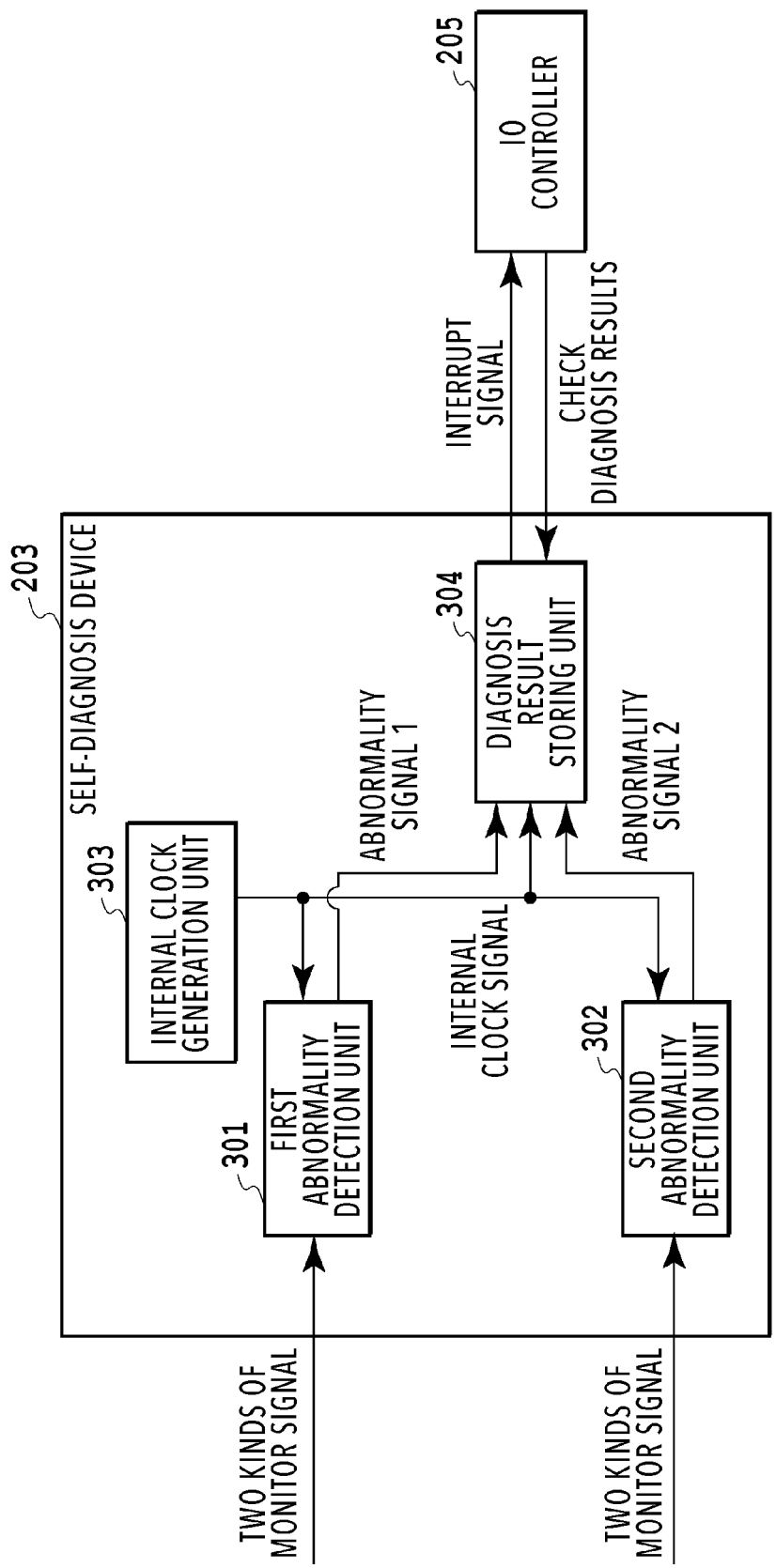
FIG. 3A is a block diagram showing an internal structure of a self-diagnosis device and FIG. 3B is a block diagram showing an internal structure of a self-diagnosis unit.

Following the above, the self-diagnosis device 203 within the main controller 101 is explained in detail. FIG. 3A is a block diagram showing the internal structure of the self-diagnosis device 203. First, with reference to FIG. 3A, an outline of the diagnosis in the self-diagnosis device 203 is explained.

The self-diagnosis device 203 includes a first abnormality detection unit 301, a second abnormality detection unit 302, an internal clock generation unit 303, and a diagnosis result storing unit 304. The self-diagnosis device 203 of the present embodiment has the two abnormality detection units, but a configuration in which the self-diagnosis device 203 has one or three or more abnormality detection units may be accepted. The self-diagnosis device 203 detects different kinds of abnormality that occur within the MFP 100 based on two kinds of monitor signal input to the first abnormality detection unit 301 and the second abnormality detection unit 302, respectively. Specifically, the first abnormality detection unit 301 detects an abnormality of the operation of the main CPU 201 and the second abnormality detection unit 302 detects an abnormality of the supply of the second power source 106.

Here, the two kinds of monitor signal input to each abnormality detection unit are explained. One of the monitor signals is a signal that acts as a trigger in the diagnosis target sequence and which changes at the time of start of the sequence (hereinafter, called a "trigger signal"). Then, the other monitor signal is a signal for determining whether there is an abnormality in the diagnosis target sequence (hereinafter, called a "check signal"). It is desirable for the check signal to be a signal capable of checking that the diagnosis target sequence is completed normally, but the check signal is not necessarily limited to this.

The internal clock generation unit 303 generates a drive clock signal used within the self-diagnosis device 203 and outputs the drive clock signal to the first abnormality detection unit 301, the second abnormality detection unit 302, and the diagnosis result storing unit 304. By using the clock signal independent of the system clock signal used within the main controller 101, it is made possible to detect an abnormality and to perform the display operation even in a case where the system clock generation unit (not shown schematically) is not in operation. In a case of detecting an abnormality, the first abnormality detection unit 301 and the second abnormality detection unit 302 respectively output an abnormality detection signal at the High level to the diagnosis result storing unit 304. In response to this, the diagnosis result storing unit 304 outputs an interrupt signal to the IO controller 205. In a case where the interrupt signal is input, the IO controller 205 accesses a register (not shown schematically) within the diagnosis result storing unit 304 and checks the contents of the abnormality.

<Details of Abnormality Detection Unit>

Figure 4A:
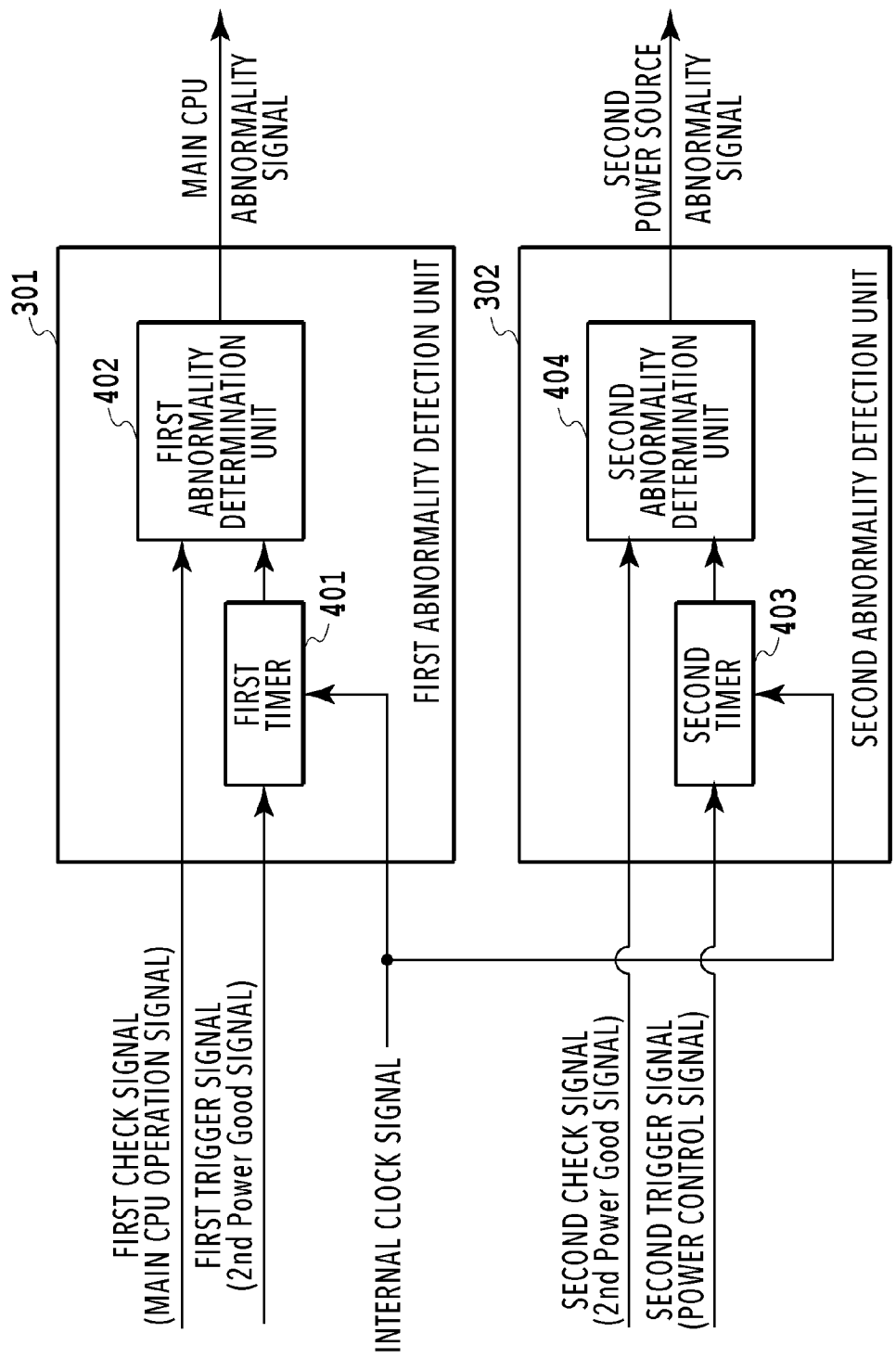
FIG. 4A is a block diagram showing details of a first abnormality detection unit and a second abnormality detection unit within the self-diagnosis device and FIG. 4B is a block diagram showing details of an abnormality detection unit within the self-diagnosis unit.

FIG. 4A is a block diagram showing details of the first abnormality detection unit 301 and the second abnormality detection unit 302. The first abnormality detection unit 301 includes a first timer 401 and a first abnormality determination unit 402, and the second abnormality detection unit 302 includes a second timer 403 and a second abnormality determination unit 404.

The first abnormality detection unit 301 detects an abnormality of the main CPU 201 by using the 2nd Power Good signal from the second power source voltage detection unit 209 as the trigger signal described above and the operation signal of the main CPU 201 as the check signal described above, respectively. The 2nd Power Good signal is input to the first timer 401 and the main CPU operation signal is input to the first abnormality determination unit 402. Here, the main CPU operation signal occurs by the IO controller 205 accessing the main CPU 201 at the time of boot thereof and writing High in terms of software to the register within the self-diagnosis device 203 via the internal bus in a case where there is a response. That is, the main CPU operation signal is a signal that changes from the Low level to the High level before the first timer 401 completes the above-described count in a case where the main CPU 201 boots normally. The first timer 401 operates by the internal clock signal and starts count of a predetermined time (for example, ten seconds) in a case where the input 2nd Power Good signal changes to the High level. Then, the first abnormality determination unit 402 outputs a main CPU abnormality signal indicating that the main CPU 201 does not boot normally to the diagnosis result storing unit 304 in a case where the main CPU operation signal is not at the High level at the point in time of the elapse of the count of the predetermined time by the first timer 401.

The second abnormality detection unit 302 detects an abnormality of the supply of the second power source 106 by using a power control signal that turns on the second power source 106 as the trigger signal described above and the 2nd Power Good signal from the second power source voltage detection unit 209 as the check signal described above, respectively. The power control signal for the second power source 106 is input to the second timer 403 and the 2nd Power Good signal is input to the second abnormality determination unit 404.

The second timer 403 operates by the internal clock signal and starts count of a predetermined time (for example, two seconds) in a case where the power control signal for the second power source 106 is input. The 2nd Power Good signal described above changes from the Low level to the High level before the second timer 403 completes the count of the predetermined time in a case where power is supplied normally from the second power source 106. Consequently, the second abnormality determination unit 404 outputs a second power source abnormality signal indicating that power is not supplied normally from the second power source 106 to the diagnosis result storing unit 304 in a case where the 2nd Power Good signal is not at the High level at the point in time of the elapse of the count of the predetermined time by the second timer 403.

<Timing of Abnormality Detection>

Figure 5:
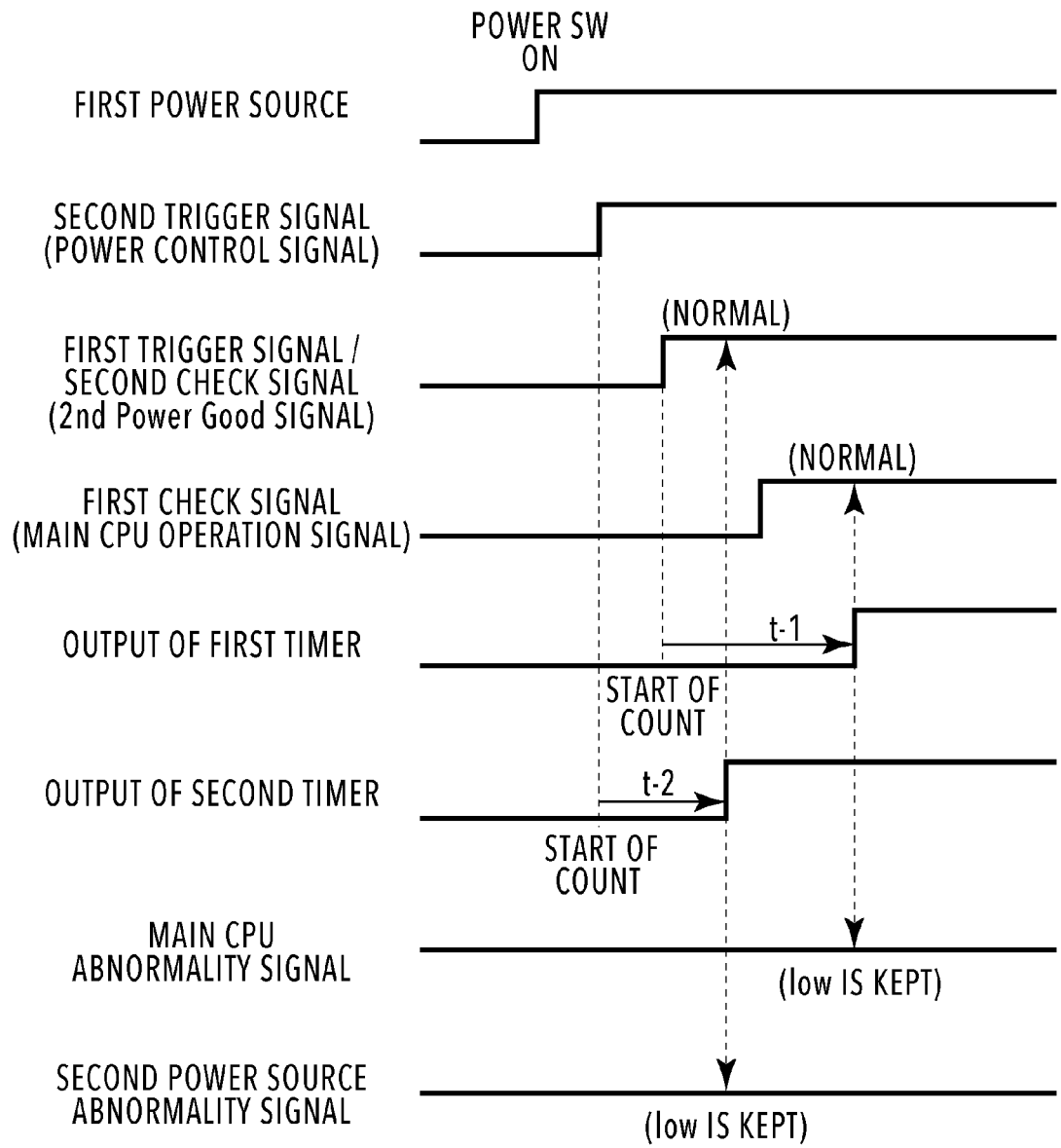
FIG. 5 is a timing chart explaining detection operations (at the normal time) of the first abnormality detection unit and the second abnormality detection unit within the self-diagnosis device.
Figure 6A:
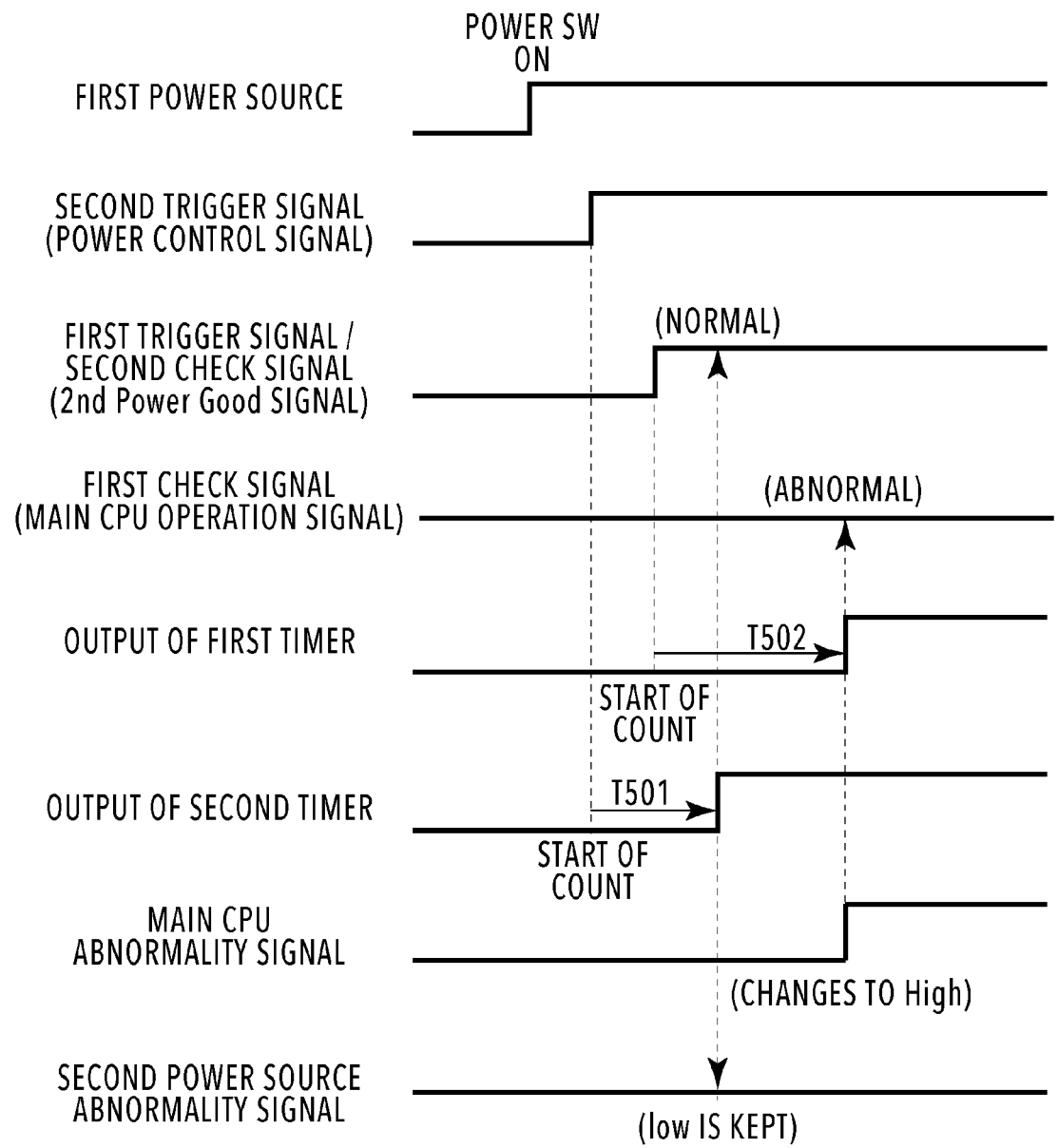
FIG. 6A is a timing chart explaining an operation at the time of detecting an abnormality of a boot sequence of a main CPU and FIG. 6B is a timing chart explaining an operation at the time of detecting an abnormality of a supply sequence of power of a second power source.
Figure 6B:
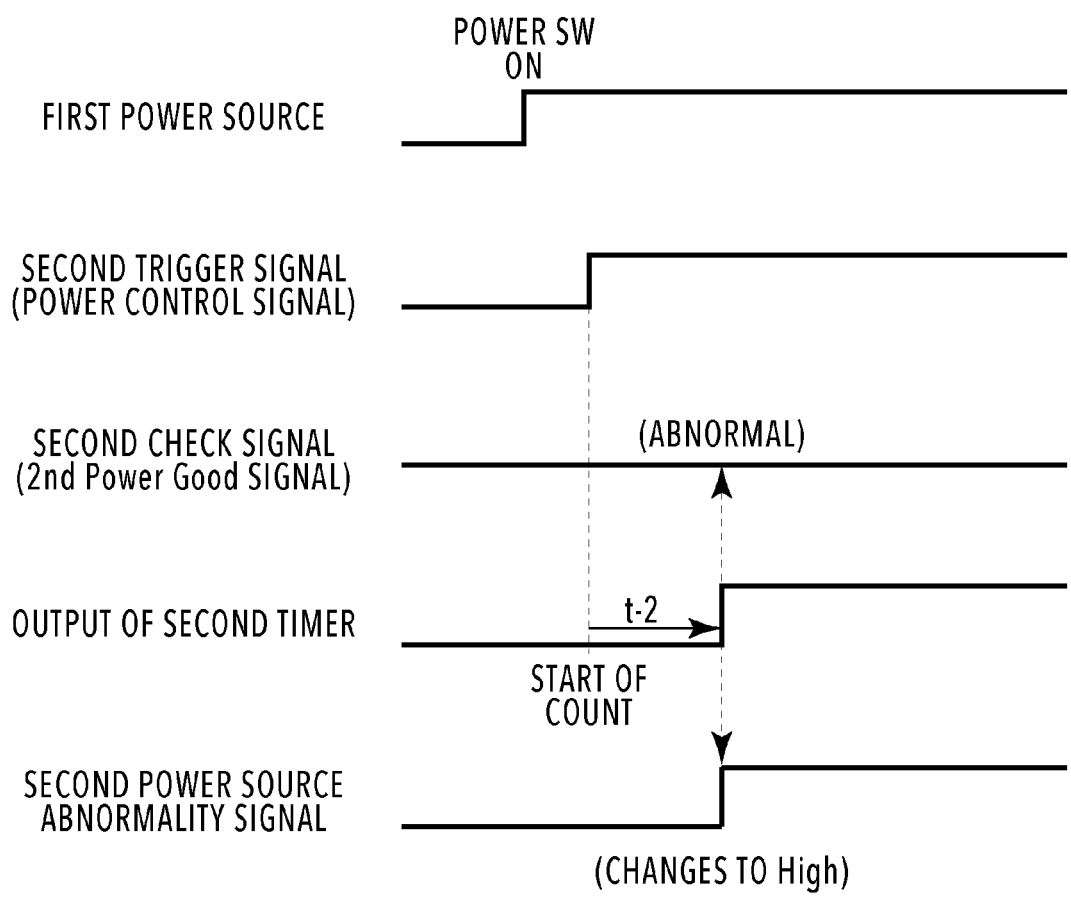

FIG. 5, FIG. 6A, and FIG. 6B are each a timing chart explaining the detection operation of the first abnormality detection unit 301 and the second abnormality detection unit 302. First, the timing chart shown in FIG. 5 is explained, which is the timing chart in a case where there is no problem both in the boot sequence of the main CPU 201 and in the supply sequence of power of the second power source unit 106.

In a case where the main power switch (not shown schematically) of the MFP 100 is turned on, the supply of power from the first power source 105 is started and a little bit later, the supply of power from the second power source 106 is started. The power control signal that turns on the second power source 106 is input to the second abnormality detection unit 302 as a second trigger signal, and due to this, the second timer 403 starts count. In a case where the 2nd Power Good signal as a second check signal is at the High level at the point in time at which a predetermined time t_2 elapses (is counted) in the second timer 403, the second abnormality determination unit 404 determines that the supply of power from the second power source 106 is performed normally and keeps the second power source abnormality signal at the Low level as it is. Next, in a case where the 2nd Power Good signal as a first trigger signal becomes the High level, the first timer 401 within the first abnormality detection unit 302 starts count. In a case where the main CPU operation signal as a first check signal is at the High level at the point in time at which a predetermined time t_1 elapses (is counted) in the first timer 401, the first abnormality determination unit 402 determines that the main CPU 201 has booted normally. Then, the main CPU abnormality signal is also kept at the Low level as it is. In response to that all the abnormality signals are at the Low level, the diagnosis result storing unit 304 saves a flag or the like indicating that there is no abnormality both in the boot sequence of the CPU 201 and in the supply of power sequence by the second power source 106 in the internal register (not shown schematically) as diagnosis results. In this case, it is assumed that the internal register of the diagnosis result storing unit 304 has the number of bits at least larger than or equal to the number of abnormality detection units. Then, the diagnosis result storing unit 304 outputs an interrupt signal to the IO controller 205 via the internal bus. The IO controller 205 having received the interrupt signal acquires the diagnosis results by accessing the internal register of the diagnosis result storing unit 304 and recognizes that there is no abnormality.

Next, the timing chart in a case where there is an abnormality in the boot sequent of the CPU 201 shown in FIG. 6A is explained. In a case where the 2nd Power Good signal as the first trigger signal becomes the High level, the first timer 401 within the first abnormality detection unit 301 starts count. The main CPU operation signal as the first check signal remains at the Low level at the point in time at which the predetermined time t_1 elapses (is counted) in the timer 401, and therefore, the first abnormality determination unit 402 determines that there is an abnormality in the boot sequence of the main CPU 201. Then, the main CPU abnormality signal that is output to the diagnosis result storing unit 304 is changed to the High level. On the other hand, there is no abnormality in the supply of power sequence of the second power source 106, and therefore, the output of the second power source abnormality signal is kept at the Low level. In response to that the main CPU abnormality signal is at the High level and the second power source abnormality signal is at the Low level, the diagnosis result storing unit 304 saves the diagnosis results indicating the contents in the internal register. That is, a flag or the like indicating that there is no abnormality in the supply of power sequence of the second power source 106 but there is an abnormality in the boot sequence of the main CPU 201 is saved. Then, the diagnosis result storing unit 304 outputs an interrupt signal to the IO controller 205 via the internal bus. The IO controller 205 having received the interrupt signal accesses the internal register of the diagnosis result storing unit 304 and acquires the diagnosis results, and recognizes the abnormality of the main CPU 201.

Next, the timing chart in a case where there is an abnormality in the supply of power sequence of the second power source 106 shown in FIG. 6B is explained. In a case where the power control signal as the second trigger signal becomes the High level, the second timer 403 within the second abnormality detection unit 302 starts count. The 2nd Power Good signal as the second check signal remains at the Low level at the point is time at which the predetermined time t_2 elapses (is counted) in the second timer 403, and therefore, the second abnormality determination unit 404 determines that the supply of power is not performed normally from the second power source 106. Then, the second power source abnormality signal that is output to the diagnosis result storing unit 304 is changed to the High level. The 2nd Power Good signal remains at the Low level, and therefore, the first timer 401 within the first abnormality detection unit 301 does not start count (omitted in FIG. 6B). In a case where an abnormality is detected for the supply of power of the second power source 106 as described above, the occurrence of the abnormality is reported at the time of detecting the same abnormality by performing reboot processing. That is, in a case where the same abnormality of the supply of power sequence is detected after reboot, the diagnosis result storing unit 304 outputs an interrupt signal to the IO controller 205 via the internal bus. The IO controller 205 having received the interrupt signal accesses the internal register of the diagnosis result storing unit 304 and acquires the diagnosis results, and recognizes the abnormality of the supply of power sequence of the second power source 106.

As described above, in the self-diagnosis device 203 within the main controller 101, the diagnosis of whether there is an abnormality in the boot sequence of the main CPU 201 and whether there is an abnormality in the supply of power sequence of the second power source 106 is performed by the two abnormality detection units.

(Self-Diagnosis Unit)

Figure 3B:
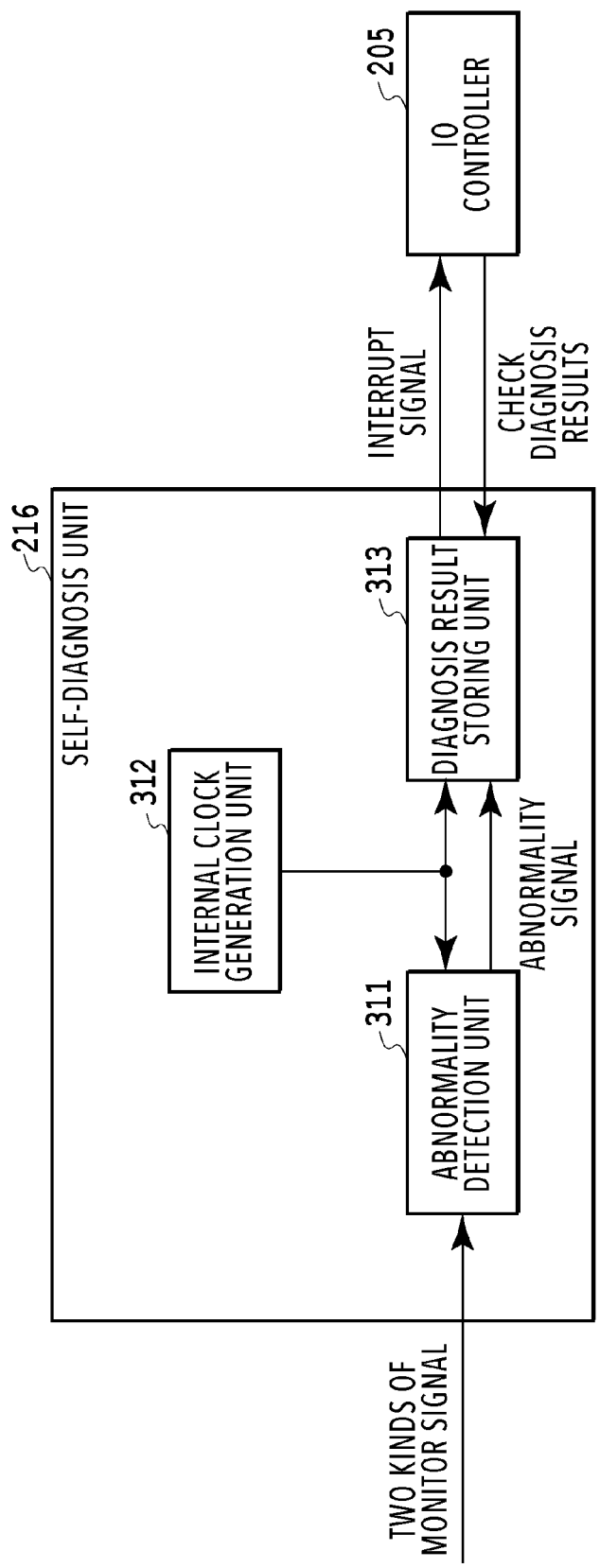

Following the above, the self-diagnosis unit 216 within the sub CPU 210 is explained in detail. FIG. 3B is a block diagram showing an internal structure of the self-diagnosis unit 216. In the present embodiment, the self-diagnosis unit is provided as one of the functions within the sub CPU 210, but it may also be possible to provide the self-diagnosis unit as a device independent of the sub CPU 210 within the UI module 102. First, with reference to FIG. 3B, an outline of the diagnosis in the self-diagnosis unit 216 is explained.

Similar to the self-diagnosis device 203 described previously, the self-diagnosis unit 216 includes an abnormality detection unit 311, an internal clock generation unit 312, and a diagnosis result storing unit 313. The self-diagnosis unit 216 of the present embodiment has one abnormality detection unit, but the configuration of the self-diagnosis unit 216 may be one in which the self-diagnosis unit 216 has two or more abnormality detection units. Similar to the self-diagnosis device 203, the self-diagnosis unit 216 diagnoses the presence/absence of abnormality relating to the UI display in the UI module 102 based on two kinds of monitor signal input to the abnormality detection unit 311.

<Details of Abnormality Detection Unit>

Figure 4B:
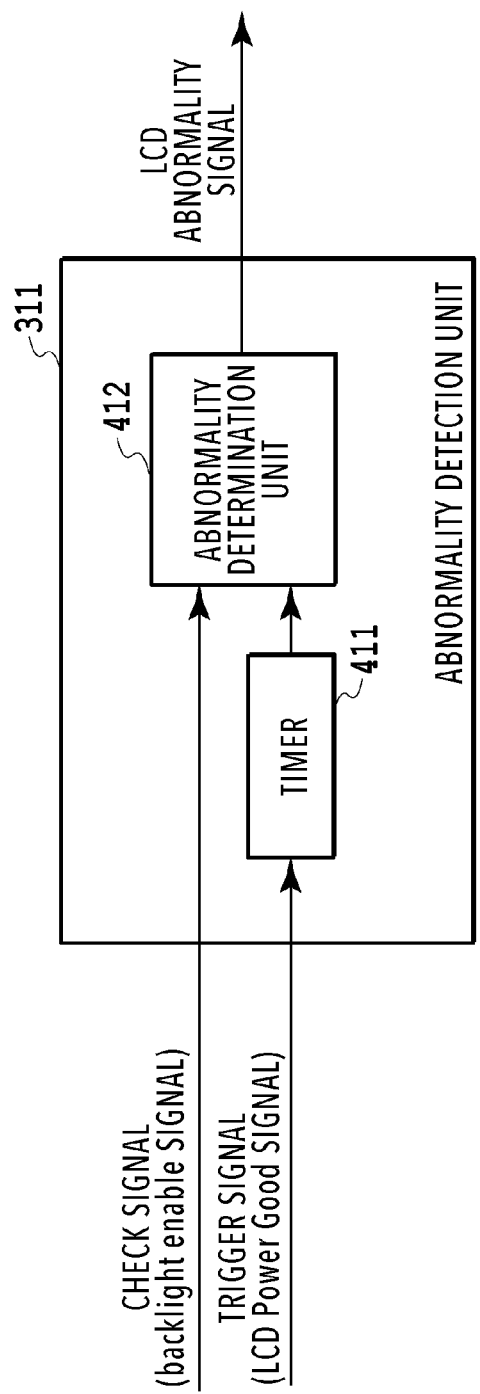

FIG. 4B is a block diagram showing details of the abnormality detection unit 311. The abnormality detection unit 311 includes a timer 411 and an abnormality determination unit 412. The abnormality detection unit 311 detects an abnormality of the image display for the UI by the LCD 212 by using the LCD Power Good signal from the LCD power source voltage detection unit 214 as a trigger signal and the Backlight enable signal as a check signal, respectively. The Backlight enable signal as a check signal is merely exemplary and the signal may be the Panel power enable signal or the PWM signal, described previously. Further, in a case where for the UI display, for example, an organic EL is used in place of the LCD, it is sufficient to take the signal that is necessary for the control thereof as a check signal. The LCD Power Good signal is input to the timer 411 and the Backlight enable signal is input to the abnormality determination unit 412. The timer 411 operates by the internal clock signal and starts count of a predetermined time (for example, three seconds) in a case where the input LCD Power Good signal changes to the High level. Then, in a case where the Backlight enable signal is not at the High level at the point in time of elapse of the count of the predetermine time by the timer 411, the abnormality determination unit 412 outputs an LCD abnormality signal indicating that the LCD 212 is not operating normally to the diagnosis result storing unit 313. In this manner, the abnormality detection unit 311 in the self-diagnosis unit 216 detects the presence/absence of abnormality of the image display by the LCD 212.

<Timing of Abnormality Detection>

Figure 7:
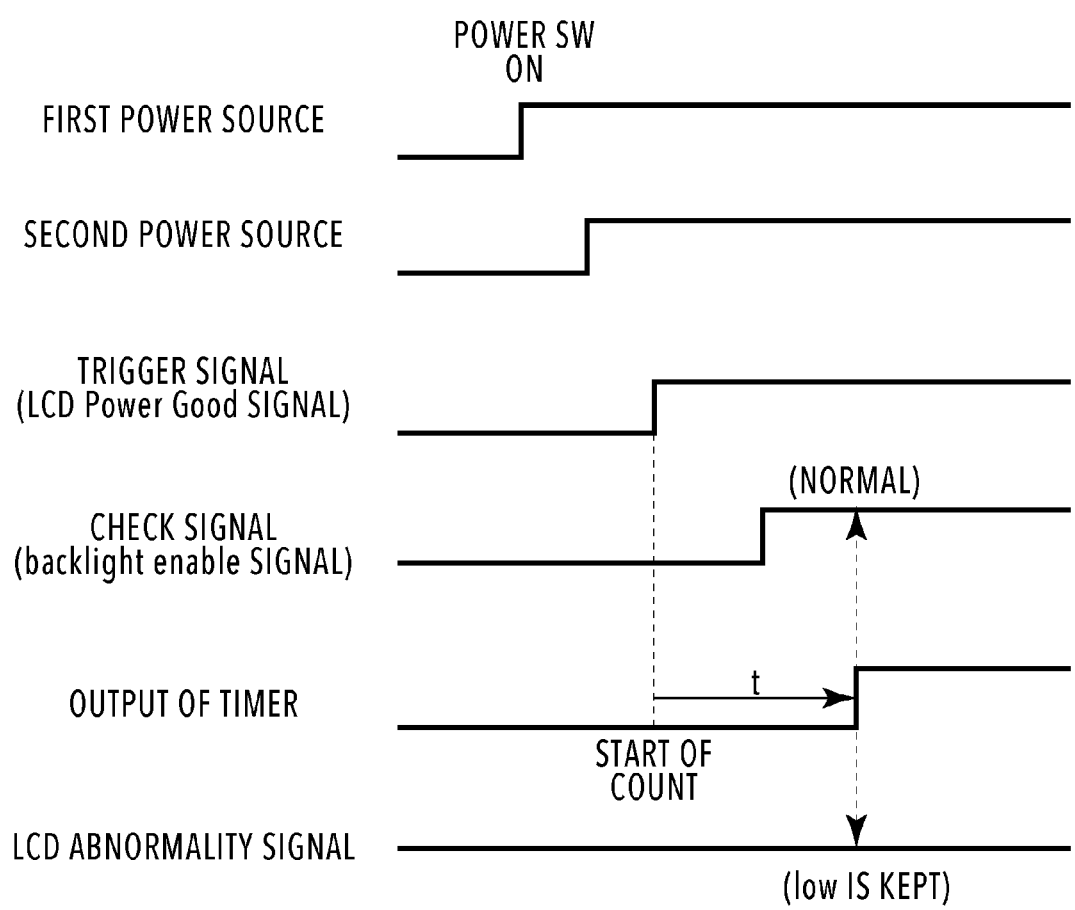
FIG. 7 is a timing chart explaining a detection operation (at the normal time) of the abnormality detection unit within the self-diagnosis unit.
Figure 8:
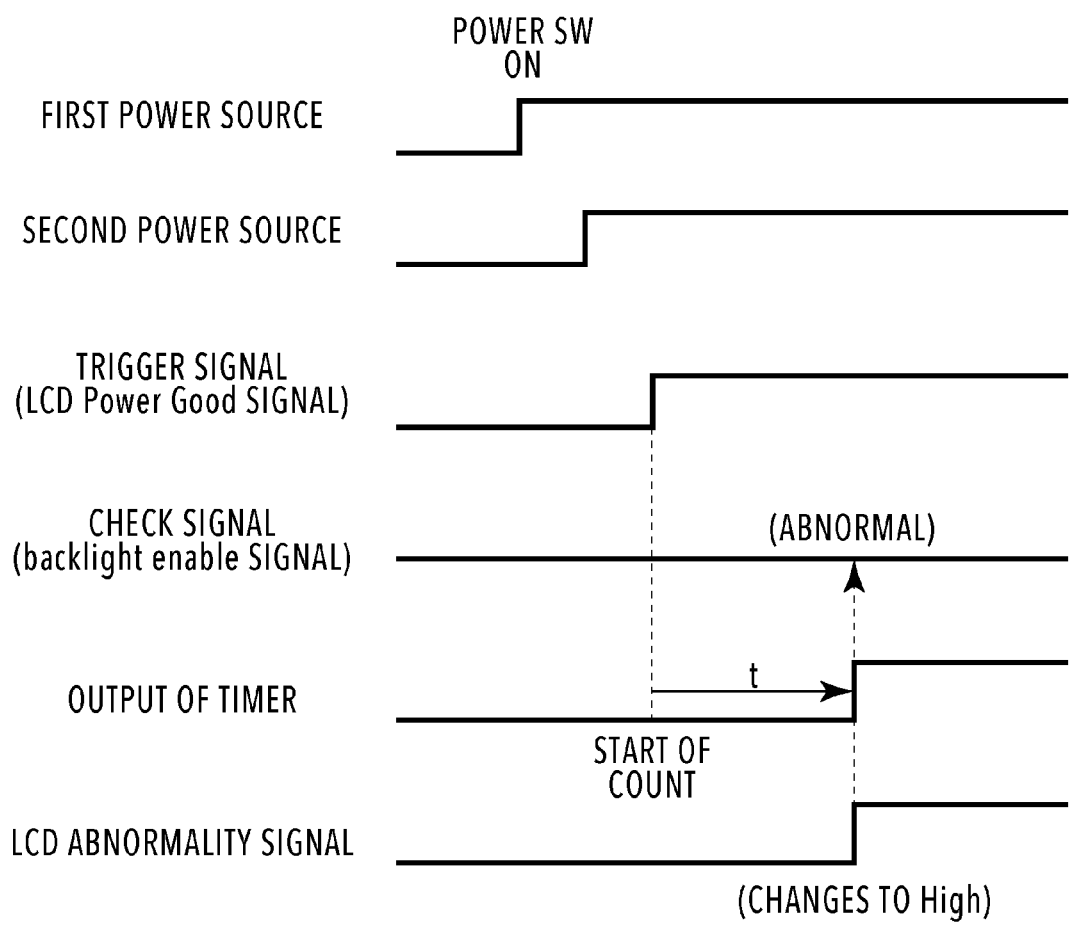
FIG. 8 is a timing chart explaining an operation at the time of detecting an abnormality of an image display sequence of an LCD.

FIG. 7 and FIG. 8 are timing charts explaining the detection operation of the abnormality detection unit 311. First, the timing chart in a case where there is no abnormality in the image display sequence of the LCD 212 shown in FIG. 7 is explained.

In a case where the main power switch (not shown schematically) of the MFP 100 is turned on, the supply of power is started from the first power source 105 and a little bit later, the supply of power from the second power source 106 is started. Then, in a case where the LCD power source 213 starts the supply of power in accordance with the power control signal from the power control device 204, the LCD power source voltage detection unit 214 outputs the LCD Power Good signal at the High level to the sub CPU 210. This LCD Power Good signal is input to the abnormality detection unit 311 within the self-diagnosis unit 216 and due to this, the internal timer 411 starts count. Then, in a case where the Backlight enable signal as a check signal is at the High level at the time at which a predetermined time t elapses (is counted) in the timer 411, the abnormality determination unit 412 determines that there is no abnormality in the image display sequence of the LCD 212 and keeps the LCD abnormality signal at the Low level as it is. In response to that the LCD abnormality signal is at the Low lever, the diagnosis result storing unit 313 saves a flag or the like indicating that there is no abnormality in the LCD 212 in the internal register (not shown schematically) as diagnosis results. The internal register of the diagnosis result storing unit 313 has at least the number of bits larger than or equal to the number of abnormality detection units and this is the same as that in the diagnosis result storing unit 304 described above. Then, the diagnosis result storing unit 313 outputs an interrupt signal to the IO controller 205 via the UART described previously. The IO controller 205 having received the interrupt signal accesses the internal register of the diagnosis result storing unit 313 and acquires the diagnosis results, and then, recognizes that there is no abnormality in the image display sequence of the LCD 212.

Following the above, the timing chart in a case where there is an abnormality in the image display sequence of the LCD 212 shown in FIG. 8 is explained. In a case where the LCD Power Good signal as a trigger signal becomes the High level, the timer 411 within the abnormality detection unit 311 starts count. The Backlight enable signal as a check signal remains at the Low level at the point in time at which the predetermined time t elapses (is counted) in the timer 411, and therefore, the abnormality determination unit 412 determines that there is an abnormality in the image display sequence of the LCD 212. As a result of this, the LCD abnormality signal changes to the High level. In response to this, the diagnosis result storing unit 313 saves diagnosis results, such as a flag, indicating that there is an abnormality in the image display by the LCD 212 in the internal register. Then, the diagnosis result storing unit 313 outputs an interrupt signal to the IO controller 205 via the UART. The IO controller 205 having received the interrupt signal accesses the internal register of the diagnosis result storing unit 313 and acquires the diagnosis results, and then, recognizes that there is an abnormality in the image display sequent of the LCD 212.

(Control Flow of Abnormality Detection)

Figure 9C:
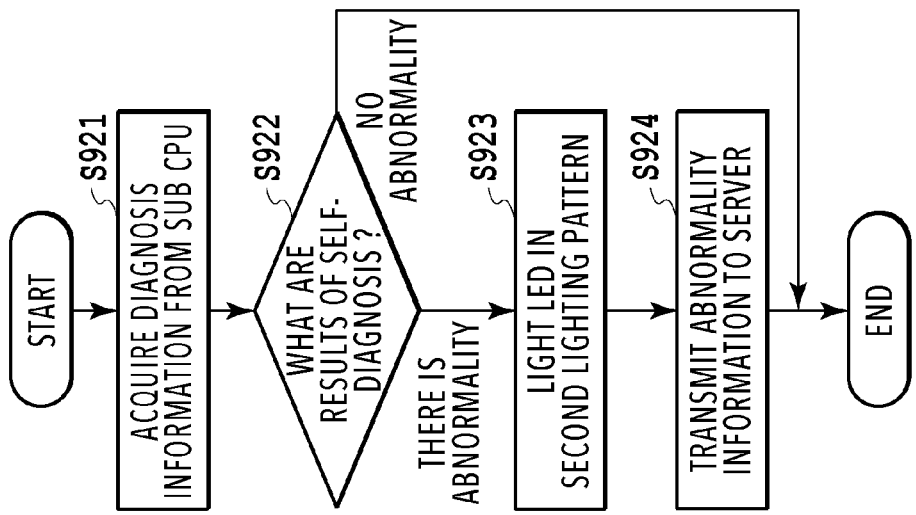
FIG. 9A to FIG. 9C are each a flowchart showing a flow of abnormality detection control at the time of boot of the MFP.
Figure 9B:
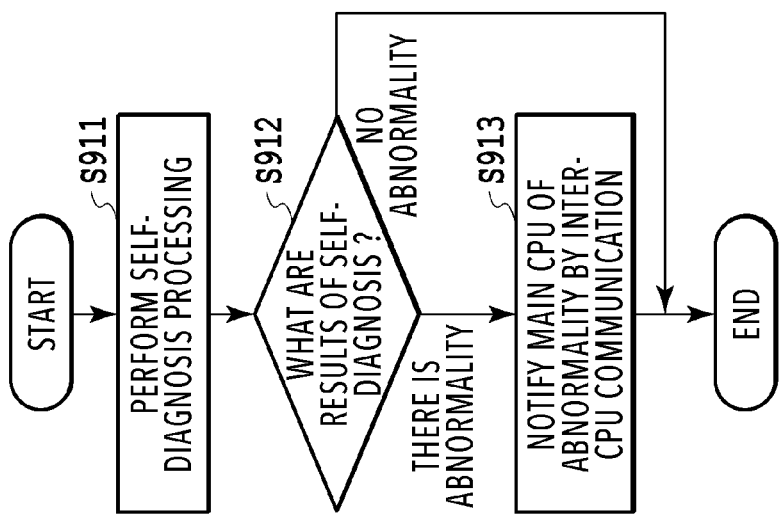
Figure 9A:
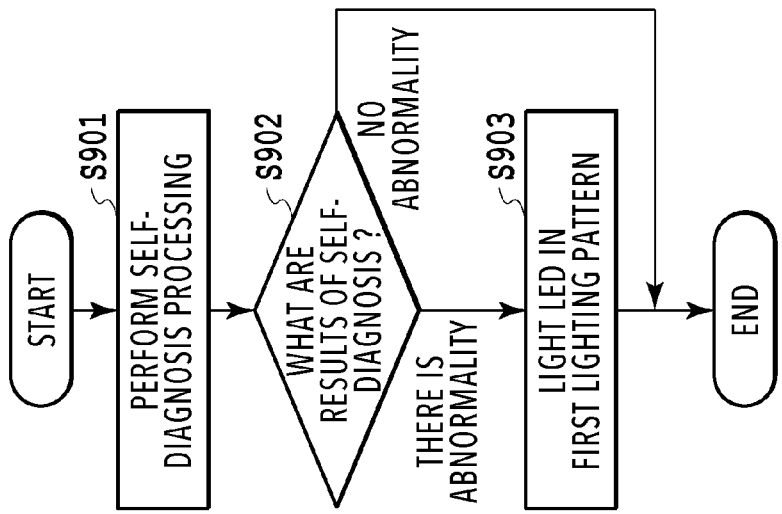

Next, abnormality detection control at the time of boot of the MFP 100 is explained. FIG. 9A to FIG. 9C are each a flowchart showing a flow of abnormality detection control and what performs the flow is different. What performs the flow in FIG. 9A is the self-diagnosis device 203, what performs the flow in FIG. 9B is the self-diagnosis unit 216, and what performs the flow in FIG. 9C is the main CPU 201. It may also be possible to implement a part or all of the processing shown by each of the flows by software. A symbol "S" in the explanation of each control flow indicates a step.

<Abnormality Detection Control of Self-Diagnosis Device>

First, the abnormality detection control in the self-diagnosis device 203 is explained with reference to the flow in FIG. 9A. In the case of the present embodiment, first, a self-diagnosis of whether there is an abnormality in the boot sequent of the main CPU 201 and the supply of power sequence of the second power source 106 is performed (S901). In accordance with the results of the self-diagnosis, the step that is performed next is different (S902). In a case where an abnormality is detected in the boot sequence of the main CPU 201 or in the supply of power sequence of the second power source 106, the LED 215 is caused to turn on in a predetermined lighting pattern by which it is possible to specify that an abnormality is detected (S903). Here, it is only required for the predetermined lighting pattern to be capable of distinguishing between the abnormality detection by the self-diagnosis results by the self-diagnosis device 203 and the abnormality detection by the self-diagnosis results by the self-diagnosis unit 216, to be described later. For example, in a case where the number of LEDs is one, the number of times of blinking per unit time is made to differ between a case of the abnormality detection by the self-diagnosis device 203 and a case of the abnormality detection by the self-diagnosis unit 216. Further, in a case where the number of LEDs is two or more, it may also be possible to cause a different LED to turn on in accordance with what has detected an abnormality is the self-diagnosis device 203 or the self-diagnosis unit 216. On the other hand, in a case where the results of the self-diagnosis indicate that there is no abnormality in the boot sequence of the main CPU 201 and in the supply of power sequence of the second power source 106, it is determined that at least the main CPU 201 boots normally and the abnormality detection control is terminated.

<Abnormality Detection Control of Self-Diagnosis Unit>

Following the above, the abnormality detection control in the self-diagnosis unit 216 is explained with reference to the flow in FIG. 9B. First, a self-diagnosis of whether there is an abnormality in the image display sequence of the LCD 212 is performed (S911). In accordance with the results of the self-diagnosis, the step that is performed next is different (S912). In a case where an abnormality is detected in the image display sequence of the LCD 212, the main CPU 201 is notified of this fact by inter-CPU communication (S913). On the other hand, in a case where no abnormality is detected in the image display sequence of the LCD 212, it is determined that there is no abnormality in the UI display in the LCD 212 and the abnormality detection control is terminated.

<Abnormality Detection Control of Main CPU>

Next, the abnormality detection control in the main CPU 201 is explained with reference to the flow in FIG. 9C. The abnormality detection control according to this flow is performed in a case where no abnormality is detected in the abnormality detection control shown by the flow in FIG. 9A described previously. That is, this abnormality detection control is performed on the condition that the supply of power from the second power source 106 is performed normally and the main CPU 201 boots normally.

Figure 10:
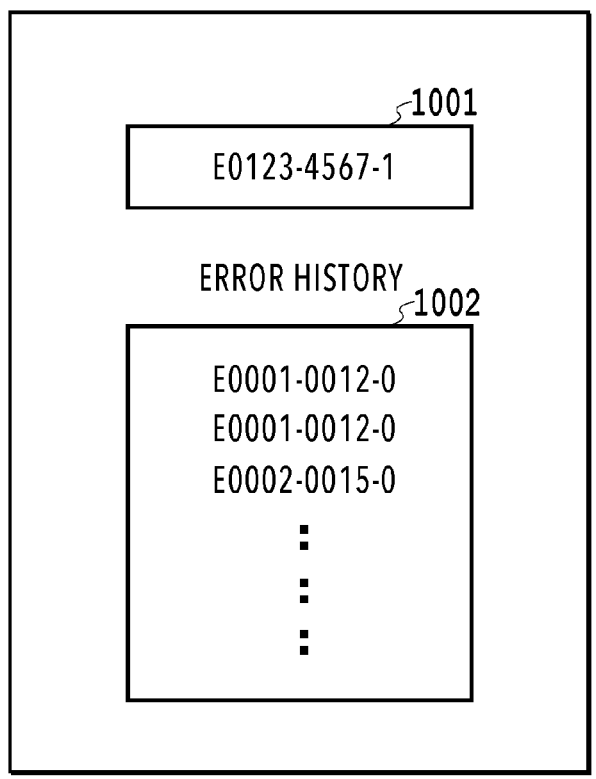
FIG. 10 is a diagram showing an example of an error display screen.

In a case where the main CPU 201 is operating normally, first, the main CPU 201 acquires the diagnosis results by the self-diagnosis unit 216 by performing inter-CPU communication with the sub CPU 210 of the UI module 102 (S921). Then, in accordance with the acquired diagnosis results, the step that is performed next is different (S922). In a case where there is no abnormality in the image display sequence of the LCD 212, this abnormality detection control is terminated. On the other hand, in a case where an abnormality is detected, the main CPU 201 causes the LED 215 to turn on in a predetermined lighting pattern by which it is possible specify that the abnormality is on the UI module 102 side (S923). The predetermined lighting pattern is the same as explained already. In a case where an abnormality is detected in the other modules including the UI module 102 except for the main CPU 201, the main CPU 201 transmits information relating to the detected abnormality to the server 110 via the LAN 120 (S924). Here, in the information relating to the abnormality, at least information on the contents of the abnormality and the location of the abnormality is included and further, information indicating whether or not countermeasures by a service person are necessary may be included. In the server 110, a screen, for example, as shown in FIG. 10, using the error information is displayed on a monitor or the like (not shown schematically). In the screen example in FIG. 10, 1001 indicates a display field indicating the situation of trouble that occurs currently. "E0123" is an error code, representing the contents of the abnormality, "4567" is a module (region) code, representing the location of the abnormality, and "1" represents the necessity of a service call (for example, 1: necessary, 0: not necessary). Further, 1002 is a display field indicating the history of the trouble that occurred in the past. It is possible for a user to grasp at which location in the MFP 100 the abnormality occurred by the display pattern of the LED 215 and the error display screen by the server 110. Then, for example, by notifying a service person of the location of the abnormality at the time of contacting the service person for the failure, it is made possible for the service person to specify parts relating to the failure before taking an action. In a case where the LAN 120 is connected to an external network, it may also be possible to directly notify a service person of the abnormality via the external network.

As above, according to the present invention, it is possible for a user to grasp the location of abnormality even in a case where, for example, the UI screen of an electronic apparatus is dark as pitch by the display pattern of a light emitting element represented by an LED and screen information displayed in a server. Further, by designing a configuration in which the UI module itself included in an electronic apparatus is caused to have an abnormality self-diagnosis function and a notification is given to a main controller by making use of inter-CPU communication, the extension of the I/O port on the side of the main controller is no longer necessary and it is possible to suppress the cost from raising.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in an electronic apparatus that performs display control of a UI by a module independent of a main controller, it is possible to detect an abnormality relating to the UI display and to notify a user or the like of the occurrence of the abnormality without increasing the number of I/O ports.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-060276, filed Mar. 27, 2018, which is hereby incorporated by reference wherein in its entirety.

What is claimed is:

1. An electronic apparatus comprising:
   a controller having a first processor and performing control of the electronic apparatus; and
   a UI module having a second processor and performing a display for a user interface by using an image data supplied from the controller, wherein
   the controller has a first diagnosis unit configured to diagnose an abnormality of at least the first processor at the time of boot of the electronic apparatus and
   the UI module:
      has a second diagnosis unit configured to diagnose an abnormality of the display; and
      notifies the controller of, in a case where an abnormality is detected by the second diagnosis unit at the time of boot of the electronic apparatus, the detected abnormality by communication between the second processor and the first processor.

2. The electronic apparatus according to claim 1, wherein the controller:
   comprises a light emitting element for indicating an abnormality detected by the first diagnosis unit and the second diagnosis unit; and
   indicates an abnormality detected by the first diagnosis unit being distinguished from an abnormality detected by the second diagnosis unit by a lighting pattern of the light emitting element.

3. The electronic apparatus according to claim 1, wherein the electronic apparatus is connected with an external device via a network and
   the controller transmits, in a case where at the time of boot, no abnormality is detected for the first processor by the first diagnosis unit and another abnormality is detected by the first diagnosis unit or the second diagnosis unit, information relating to the detected abnormality to the external device via the network.

4. The electronic apparatus according to claim 3, wherein in the information relating to the detected abnormality, information on at least contents of the detected abnormality and a location of the detected abnormality is included.

5. The electronic apparatus according to claim 1, wherein the electronic apparatus has at least two operation modes, that is, a normal power mode and a power-saving mode in which power consumption is lower than that in the normal power mode and
   the time of boot includes both the time of a main power switch of the electronic apparatus being turned on and the time of a transition into the normal power mode by returning from the power-saving mode.

6. The electronic apparatus according to claim 5, wherein the second diagnosis unit detects the abnormality of the display based on a first signal indicating whether power for performing the display is supplied normally and a second signal indicating whether the display is normal and
   the power for performing the display is power that is not supplied in the power-saving mode.

7. The electronic apparatus according to claim 6, wherein the second diagnosis unit determines, in a case where the second signal does not indicate that the display is normal at a point in time of an elapse of a predetermined time after the first signal indicates that the power for performing the display is supplied normally, that the display is abnormal.

8. The electronic apparatus according to claim 7, wherein the second diagnosis unit has a timer that counts the predetermined time and
   the timer operates by a clock signal different from a clock signal used within the controller.

9. A method of detecting an abnormality at the time of boot in an electronic apparatus comprising:
   a controller having a first processor and performing control of the electronic apparatus; and
   a UI module having a second processor and performing a display for a user interface by using an image supplied from the controller, the method comprising the steps of:
      diagnosing, by the controller, an abnormality of at least the first processor at the time of boot; and
      by the UI module:
         diagnosing an abnormality of the display at the time of boot; and
         notifying, in a case where an abnormality of the display is detected, the controller of the detected abnormality of the display by communication between the second processor and the first processor.

\* \* \* \* \*